United States Patent [19]

Gibaud et al.

[11] Patent Number: 4,746,431
[45] Date of Patent: May 24, 1988

[54] DEVICE FOR THE COLLECTION OF WATER IN A GRANULAR MATERIAL BED FILTER

[75] Inventors: Jean-Philippe Gibaud, Paris; Jean Durot, Villepreux; Robert Louboutin, Crespieres, all of France

[73] Assignee: Degremont, S. A., France

[21] Appl. No.: 853,747

[22] Filed: Apr. 18, 1986

[30] Foreign Application Priority Data

Apr. 19, 1985 [FR] France .............................. 85 05986

[51] Int. Cl.⁴ ............................................ B01D 23/10
[52] U.S. Cl. ..................................... 210/274; 210/293
[58] Field of Search ............................... 210/792–796, 210/274–279, 286, 293

[56] References Cited

U.S. PATENT DOCUMENTS

| 3,313,420 | 4/1967 | Hirsch | 210/275 |
| 3,600,305 | 8/1971 | Edgerton | 210/298 |
| 4,322,299 | 3/1982 | Scholten et al. | 210/794 |
| 4,338,202 | 7/1982 | Louboutin | 210/293 |
| 4,478,726 | 10/1984 | Moore | 210/793 |
| 4,604,197 | 8/1986 | Louboutin et al. | 210/293 |

FOREIGN PATENT DOCUMENTS

| 0036793 | 9/1981 | European Pat. Off. |
| 0340319 | 5/1920 | Fed. Rep. of Germany |
| 2101494 | 1/1983 | United Kingdom |
| 2118452 | 11/1983 | United Kingdom |

Primary Examiner—Ivars Cintins
Attorney, Agent, or Firm—Sandler & Greenblum

[57] ABSTRACT

A device for the collection of water from a granular material bed filter includes means for injecting water and air through the filtration bed as well as an outer chute provided with a weir for the discharge of water, characterized in that it is made of a storage capacity placed between the filter and the discharge chute and defined by a vertical perforated wall such as a grid situated in vertical alignment with the filter vertical wall, and a plane slanting inwardly to the inside of the filter, said slanting plane connecting the weir for the discharge of the water via the chute to the filter wall situated below the vertical perforated wall such as the grid.

8 Claims, 1 Drawing Sheet

DEVICE FOR THE COLLECTION OF WATER IN A GRANULAR MATERIAL BED FILTER

FIELD OF THE INVENTION

The present inventon relates to a device for the collection of water from a granular material bed filter of the type of filters used currently for the processing of waters for eliminating the materials in suspension and more particularly for the biological clarification by fixed cultivations.

Said filters, which include at least one layer of granular material, are designed, according to their use, so as to operate with a downward flow or with an upward flow, the water to be filtrated being distributed by a means of some sort respectively above the filtration mass and underneath the bottom on which lies the filtration mass. A periodical washing of the granular material bed is always necessary, the most efficient washing technique consisting in carrying out, in known manner, an injection from bottom to top of the filtration mass with air and washing water—such a washing being called "countercurrent" washing when the filters are operated with a downward flow.

The washing water is collected by a chute and discharged to the sewer.

However, such a washing technique, when applied to a filter of which one at least of the filtration materials is a porous material of low density such as: treated anthracite, pumice stone, expanded clay, etc., is the cause of difficulties since, during the water and air washing period, a portion of the filtration mass is being entrained to the washing water discharge chute.

BACKGROUND OF PRIOR ART

It is known to remedy this disadvantage by accumulating the washing water, during the water and air washing period, in a storage capacity disposed above the discharge chute, said chute being provided with a device such as a flap, a grid, a seeve, ... which allows the total or partial closing of the chute during the washing period.

Such known devices have the disadvantage of a large and useless height outside the washing period; moreover, they necessitate a certain period for the decantation of the filtration material and also of the extracted impurities, and therefore a water flow rate which is all the more important that the distance to be covered by the washing water up to the discharge chute is great.

Other devices have been proposed, consisting in vertical or slanting walls placed in the vicinity around the washing water discharge chute, said walls being designed for deflecting the air flow entraining the material grains, thereby creating a favourable zone for the decantation of said grains. Moreover, on the other hand, these known devices include generally a horizontal grid disposed above the filtration material and therefore likely to be obstructed during the wahing period by the extracted impurities and the filtration material itself, thereby causing a reduction of the system efficiency.

On the other hand, said known devices are applicable only to the collection of the washing water and are not usable for the collection of the water treated in the granular material bed filters used for the biological clarification on fixed cultivations and in which the water and air are injected from bottom to top during the treatment phase as well as during the material washing phase: in said filters indeed, the known devices designed for a periodical usage are not sufficient for avoiding turbulence phenomena due to the permanent blowing of air in the filter. Moreover, when used continuously, they get rapidly clogged.

OBJECTS AND SUMMARY OF THE INVENTION

The device which is the object of the present invention remedies these disadvantages and allows totally avoiding the loss of material by separating said material from the treated water and from the washing water and by bringing it back automatically in the filter.

The invention consists in a device for the collection of water in a granular material bed filter comprising means for the injection of water and air through the filtration bed as well as an outer chute provided with a weir for the discharge of water, said device being characterized in that it is made of a storage capacity, placed between the filter and the discharge chute and defined by a vertical perforated wall suitated in vertical alignment with the filter wall, and a plane slanting inwardly to the filter, said slanting plane connecting the weir for the water discharge by the chute to the filter wall situated below the perforated wall.

According to a preferred disposition of the invention, the perforated wall is made of a grid.

According to the invention, the vertical grid disposed in vertical alignment with the filter wall is made of at least one row of elements such as sections, bars, plates, rods, of any shape and material, spaced apart by a distance greater than the size of the grains of the filtration material.

According to a preferred embodiment of the invention, the vertical grid is made of two rows of elements spaced apart by a distance greater than the size of the filtration material grains and disposed according to a staggered arrangement.

The spacing betwen the grid elements is, according to the invention, advantageously between preferably 1 and 20 cm.

According to the invention, the slanting plane connecting the weir to the filter forms preferably an angle between 40° and 60° to the horizontal.

BRIEF DESCRIPTION OF THE DRAWINGS

The various features and advantages of the invention will become more apparent from the following description of one of its possible embodiments, given only by way of example.

For this description, reference will be made to the accompanying drawings wherein.

DETAILED DESCRIPTION OF THE INVENTION

Figure 1:
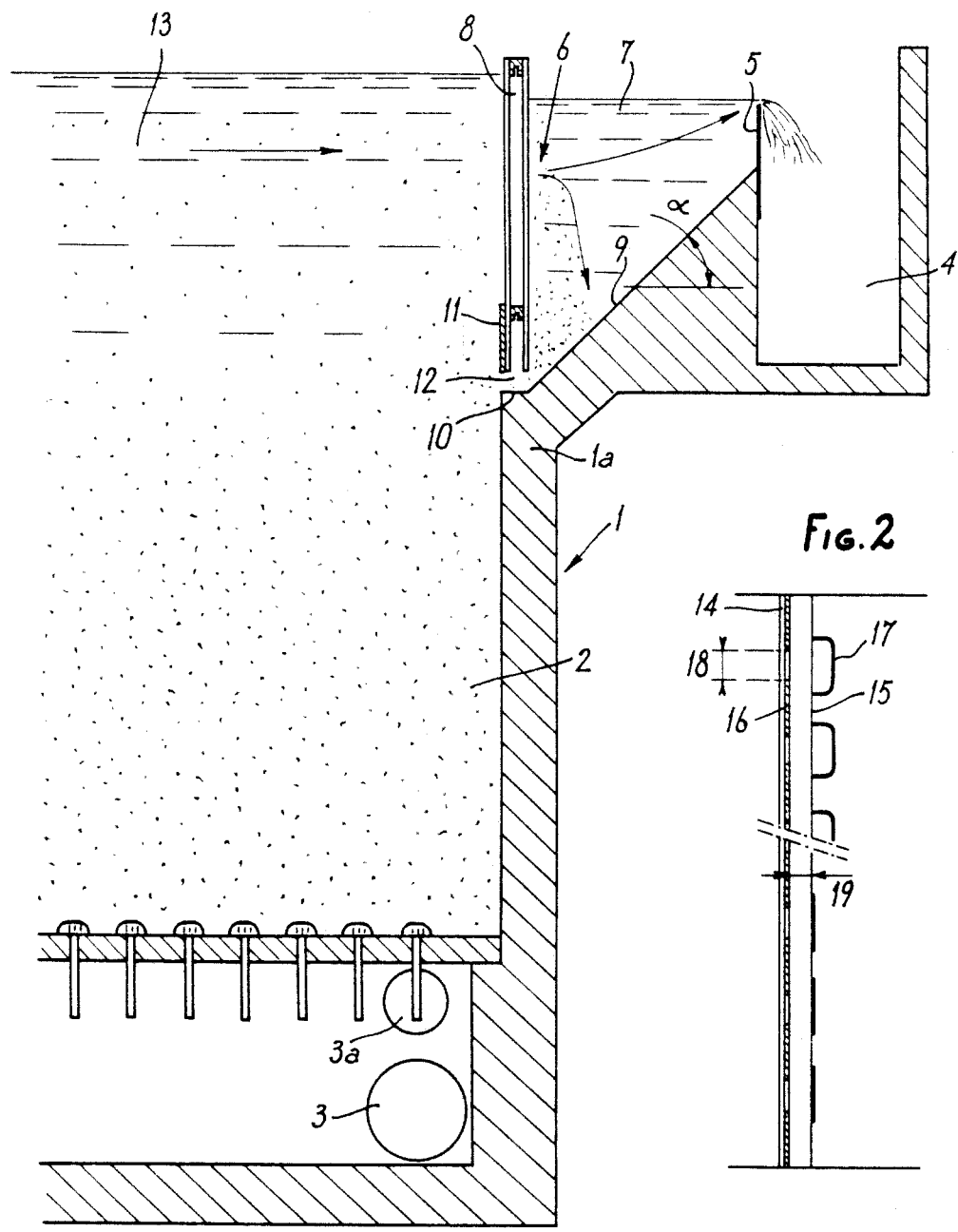
FIG. 1 is a sectional view of the device according to the invention.

Filter 1 with a granular material bed 2 including known water feeding means 3 and air feeding means 3a for the treatment of the water and the washing of the filtration material, as well as a chute 4 for discharging the treated water or the washing water, having an adjustable weir 5, is provided with the device 6 according to the invention.

Said device is made of the storage capacity 7 defined by grid 8 and slanting plane 9 connecting the weir 5 to wall 1a of the filter situated below grid 8 and slanting to the filter with a slope forming and angle α of 50° to 60° to the horizontal. This slanting plane is connecting to the filter by a horizontal plane 10, of 5 to 15 cm in width. A screen 11 masking the grid base and vertically movable on the latter provides an adjustable opening 12 for the passage of the returning fluid entraining the grains and material in the filter.

The discharge of water by weir 5 creates a water current flowing from zone 13 above the filtration material toward the storage capacity 7. This zone 13 is subjected to a strong agitation due to the air injected in the filter and flowing upwardly. Grid 8 which is on the path of travel of the water-air emulsion coming from zone 13 causes the air bubbles and the filtration material grains entrained by the water to clash against each other, and enhances their separation which is carried out in storage capacity 7 with a decantation of the grains on slanting plane 9.

This decantation is also promoted by the absence in the zone created by the storage capacity of a speed vertical component. The result is that the lighter impurities detached from the filtration material are driven away to the weir in order to be discharged by the chute, while the material grains decant on the slanting plane.

Moreover, it has been established that the passage of the water and air emulsion which is above the filter through the grid causes a disruption of said emulsion, and that the resulting difference between the emulsion density which is above the filtration material and that of the fluid which is in the storage capacity 7 creates a top to bottom circulation of part of the fluid transiting through the storage capacity, thereby automatically bringing back to the inside of the filter the material grains decanting on the slanting plane, the other portion of the fluid being directed to the weir and the chute, as shown by the arrows in FIG. 1.

Slanting plane 9 is advantageously connected to the filter by a horizontal plane 10 for avoiding a washout of the filtration layer by the fluid flow returning to the filter and bringing back to it the decanted material grains.

The density difference of the fluids present in zone 13: water-air emulsion, and in storage capacity 7: water alone, creates a return flow toward the bottom of the storage capacity and therefore the filter.

Figure 2:
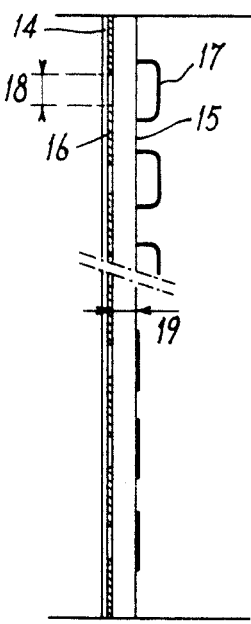
FIG. 2 shows a detail of the device according to the invention in the preferred embodiment of said invention, where the vertical grid is made of two rows of elements disposed in a staggered arrangement.

As shown in FIG. 2, grid 8 is advantageously made of two rows 14, 15 of elements such as for example plates 16 and sections 17, disposed vertically, preferably in a staggered arrangement, so as to further enhance the disruption of the water-air emulsion.

Distance 18 between two elements, such as the successive plates or sections of the same row, is generally between 1 and 10 cm; distance 19 between two rows of said elements is also between 2 and 10 cm, each element having a length between 5 and 20 cm.

The grid can be made of elements such as sections, which are different according to the types of filtration materials used.

What is claimed is:

1. An apparatus for the collection of water from a filter comprising a bed of granular filtration material contained in a filter having a discharge side wall, means for passing water and air through the bed of granular filtration material operably associated with the filter, and means for discharging water from the filter attached to said discharge side wall, said means for discharging comprising an outer chute provided with a weir for the discharge of water, an intermediate collection zone located between the filter and the outer chute defined by a vertical perforated wall situated in vertical alignment with the discharge side wall, the weir and a floor slanting downwardly, inwardly from the weir to the discharge side wall, said slanting floor connecting the weir for the discharge of water to the discharge side wall situated below the vertical perforated wall.

2. An apparatus according to claim 1, wherein the vertical perforate wall is made of at least one row of elements selected from the group of sections, bars, plates, and rods separated by a space sufficient to permit passage of granular filtration material through said space.

3. An apparatus according to claim 1, wherein the vertical perforated wall is made of a plurality of rows of superposed elements arranged in a staggered manner and separated by a predetermined distance.

4. An apparatus according to claim 3, wherein the space provided between the superposed elements forming the vertical perforated wall is between 1 and 10 cm and the distance between two rows of elements is between 2 and 10 cm.

5. An apparatus according to claim 1, wherein the slanting floor connecting the weir to the discharge side wall forms an angle of 40° to 60° to the horizontal.

6. An apparatus according to claim 1, wherein the slanting floor is connected to the discharge side wall by a horizontal plane.

7. An apparatus according to claim 6, wherein the vertical perforated wall includes a grid.

8. An apparatus according to claim 7, wherein the bottom of the grid is masked by a screen adapted to be adjusted in position on the grid so as to define an opening at the base of said grid sufficient for the passage of said granular filtration material grains.

* * * * *

UNITED STATES PATENT AND TRADEMARK OFFICE
CERTIFICATE OF CORRECTION

PATENT NO. : 4,746,431

DATED : May 24, 1988

INVENTOR(S) : Jean-Philippe GIBAUD et al.

It is certified that error appears in the above-identified patent and that said Letters Patent is hereby corrected as shown below:

Column 2, line 20, change "suitated" to ---situated---.
Column 3, line 4, change "and" to ---an---.
Column 1, line 58, change "wahing" to ---washing---.

Column 3, line 15, insert ---,--- after "8".
Column 3, line 16, insert ---,--- after "13".
Column 3, line 51, insert ---,--- after "as" and before "for".
Column 3, line 51, insert ---,--- after "example" and before "plates".
Column 4, line 3, insert ---,--- after "19".
Column 4, line 4, insert ---,--- after "elements" and before "is".
Column 4, line 27, change "perforate" to ---perforated---.

Signed and Sealed this

Twentieth Day of June, 1989

*Attest:*

DONALD J. QUIGG

*Attesting Officer*    Commissioner of Patents and Trademarks